United States Patent
Idegami et al.

(10) Patent No.: US 9,702,023 B2
(45) Date of Patent: *Jul. 11, 2017

(54) METHOD FOR PRODUCING HIGH-PURITY NICKEL SULFATE

(71) Applicant: Sumitomo Metal Mining Co., Ltd., Tokyo (JP)

(72) Inventors: Atsushi Idegami, Niihama (JP); Yoshitomo Ozaki, Niihama (JP); Shin-ichi Heguri, Niihama (JP); Keiji Kudou, Niihama (JP); Hideki Ohara, Niihama (JP); Shinya Matsumoto, Niihama (JP)

(73) Assignee: Sumitomo Metal Mining Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/387,571

(22) PCT Filed: Feb. 13, 2013

(86) PCT No.: PCT/JP2013/053406
§ 371 (c)(1),
(2) Date: Sep. 24, 2014

(87) PCT Pub. No.: WO2013/145909
PCT Pub. Date: Oct. 3, 2013

(65) Prior Publication Data
US 2015/0078972 A1     Mar. 19, 2015

(30) Foreign Application Priority Data

Mar. 29, 2012  (JP) ................. 2012-077613

(51) Int. Cl.
| | | |
|---|---|---|
| *C22B 23/00* | (2006.01) | |
| *C22B 3/00* | (2006.01) | |
| *C01G 53/10* | (2006.01) | |

(52) U.S. Cl.
CPC .......... *C22B 23/0469* (2013.01); *C01G 53/10* (2013.01); *C22B 23/0461* (2013.01); *C01P 2006/80* (2013.01)

(58) Field of Classification Search
USPC ......................... 423/146, 147, 544
IPC ............................ C01G 53/10; C22B 23/0469
See application file for complete search history.

(56) References Cited

U.S. PATENT DOCUMENTS

| | | | |
|---|---|---|---|
| 3,469,967 A * | 9/1969 | Evans ....................... | B22F 9/18 |
| | | | 75/232 |
| 3,656,937 A * | 4/1972 | Gandon et al. ................ | 75/731 |
| 6,432,580 B1 | 8/2002 | Fierro et al. | |
| 6,444,363 B1 | 9/2002 | Benet et al. | |
| 2005/0265910 A1 | 12/2005 | Kobayashi et al. | |
| 2008/0075645 A1* | 3/2008 | Wallevik ................... | C01F 5/30 |
| | | | 423/140 |

FOREIGN PATENT DOCUMENTS

| | | |
|---|---|---|
| CN | 1050367 | 4/1991 |
| CN | 101760635 | 6/2010 |
| CN | 102212690 | 10/2011 |
| JP | 61-106422 | 5/1986 |
| JP | 02-172829 | 7/1990 |
| JP | 10-030135 | 2/1998 |
| JP | 10-218623 | 8/1998 |
| JP | 10-310437 | 11/1998 |
| JP | 2004-516607 | 6/2004 |
| JP | 2004284848 | 10/2004 |
| JP | 2005-350766 | * 12/2005 |
| JP | 2009-203082 | 9/2009 |

OTHER PUBLICATIONS

Chemical Abstracts Accession No. 1989:26157.

* cited by examiner

*Primary Examiner* — Steven Bos
(74) *Attorney, Agent, or Firm* — Gerald E. Hespos; Michael J. Porco; Matthew T. Hespos

(57) ABSTRACT

Provided is a method of producing high-purity nickel sulfate by an impurity-element removal method for selectively removing Mg from a Ni-containing solution. The method comprises a production process of producing nickel sulfate from a Ni-containing acid solution, the acid solution being treated in order of steps (1) to (3): (1) carbonation step, adding a carbonating agent into the Ni-containing solution to make Ni contained in the Ni-containing solution into a precipitate of nickel carbonate or a mixture of nickel carbonate and nickel hydroxide, thereby forming a slurry after carbonation including the precipitate and a solution after carbonation; (2) solid-liquid separation step, separating the slurry after carbonation formed in the carbonation step into the precipitate and the solution after carbonation; and (3) neutralization step, adding a neutralizing agent into the solution after carbonation separated through the solid-liquid separation step to recover Ni contained in the solution after carbonation as a Ni-precipitate.

5 Claims, 2 Drawing Sheets

METHOD FOR PRODUCING HIGH-PURITY NICKEL SULFATE

BACKGROUND

1. Field of the Invention

The present invention is applicable to a field in which it is intended to derive high-purity nickel sulfate from a nickel-containing acid solution, the high-purity nickel sulfate being usable as a battery material containing less amount of impurities, particularly magnesium and calcium.

2. Description of the Related Art

Nickel has been widely used as a material for stainless steel and corrosion-resistant alloys, and besides, in recent years, nickel has been frequently used as a material for nickel-metal hydride batteries and lithium-ion batteries used for hybrid electric vehicles, cell phones, personal computers, and the like.

Nickel used as these materials has been produced by mining mineral ores that exist in the form of sulfide ore or oxide ore, and smelting the mineral ores.

One example of methods for processing a sulfide ore is such that a sulfide ore is put into a furnace to melt; impurities are separated therefrom as slag to form a matte containing concentrated nickel; said matte is dissolved with sulfuric acid or hydrochloric acid; and impurities are separated from the dissolved solution to obtain a nickel solution. Then, the obtained nickel solution is neutralized, crystallized, or the like, whereby nickel salts, such as nickel sulfate and nickel oxide, are produced. Alternatively, sometimes nickel metals are produced by electrolytic winning or the like.

On the other hand, one example of methods for processing an oxide ore is such that an oxide ore is heated and melted together with a reducing agent, such as coke, to be separated from slag, whereby ferronickel, which is an alloy of nickel and iron, is obtained to be used as a material for stainless.

However, any of these smelting methods requires a large amount of energy and a great deal of time, effort and cost for separation of impurities.

Particularly, in recent years, high-quality ores are being depleted, and accordingly it has been hard to secure such high-quality ores, as a result, the nickel grade in ores available tends to be lower, and thus more time, effort and more costs have been required to obtain nickel from such low-grade raw materials.

Therefore, there has been recently developed a method of obtaining a nickel salt or nickel metal by subjecting low level oxide ores that have not been conventionally used as raw materials, to acid leaching under high temperature and pressure, and neutralizing the leached solution with an alkali such as slaked lime.

This method enables a low-grade resource to be used effectively and with relatively less energy, but, in the case where the above-mentioned nickel salts need to be obtained, there has arisen new problems that never have been found in conventional smelting methods.

For example, according to the above-mentioned smelting method using a furnace, most of magnesium contained in ores are distributed to the slag, and accordingly, less magnesium is distributed to the matte. As a result, the amount of incorporation thereof into nickel salts was limited to a very low level, and the incorporation hardly caused any problem.

On the contrary, according to the smelting method using high temperature and pressure leaching, magnesium and manganese are leached well with acid, and as a result, incorporation of the elements into nickel salts is also increased. Furthermore, in high temperature and pressure leaching, there is performed a neutralization operation, wherein a neutralizing agent is added to an obtained leached slurry to adjust the pH thereof and whereby components other than a target metal are precipitated and separated therefrom, and, in the case of using calcium hydroxide or the like, which is industrially inexpensive, as a neutralizing agent, an effect of the incorporation of calcium obtained after the reaction into nickel salts cannot be disregarded.

Particularly, in the case where nickel is used in a material for lithium-ion batteries or nickel hydride batteries, coexistence of nickel with magnesium, calcium, chloride ions greatly affects the characteristics of a battery finished as a product, and therefore, there is desirable a high-purity nickel salt which is obtained by avoiding the incorporation as much as possible from a stage of producing the nickel salt.

In the meanwhile, in order to obtain nickel sulfate, which is one of nickel salts, with high purity, another method may be considered, wherein, for example, nickel is once obtained as a metal by electrolytic winning or the like, and this metal is dissolved again in sulfuric acid, and then, the dissolved solution is concentrated to crystallize nickel sulfate. However, obtaining such metal requires a considerable amount of electric power and a correspondingly large scale of equipment, and therefore, in consideration of energy efficiency and costs, the method is not advantageous.

Furthermore, in many cases, a nickel-containing ore also contains cobalt. Cobalt is also a valuable metal and does not need to coexist with nickel, and therefore, cobalt and nickel are separated and individually recovered.

As an efficient and practical method of separating nickel and cobalt contained in a sulfuric acid solution, solvent extraction has been often employed. For example, Japanese Patent Application Laid-Open No. H10-310437 discloses an example of separating nickel and cobalt by extracting cobalt by solvent extraction using trade name: PC88A (manufactured by Daihachi Chemical Industry Co., Ltd.) as an extractant.

In the case of using PC88A as the extractant, the extraction behavior of magnesium and calcium resembles the extraction behavior of nickel, and therefore, when solvent extraction is applied to a solution containing high-concentration nickel, there occurs a problem of a decrease in efficiency of separating magnesium and calcium, such as a decrease in the extraction rate of magnesium and calcium.

On the other hand, Japanese Patent Application Laid-Open No. H10-30135 discloses a method for producing an aqueous solution of high-purity nickel which does neither include any sodium nor ammonia, from an aqueous nickel solution containing calcium, magnesium, cobalt and the like as impurities, by extracting and separating impurities in the aqueous nickel solution using an alkylphosphonic acid ester or an alkylphosphinic acid, each containing nickel, as an extractant.

According to the method proposed in Japanese Patent Application Laid-Open No. H10-30135, the method is such that nickel is extracted into an organic solvent having a high pH in advance, and the organic solvent into which nickel is extracted is made to come into contact with a nickel solution containing impurities, and there occurs an exchange reaction in which elements more easily extracted than nickel are transferred to an organic phase, while nickel in the organic solvent is transferred to an aqueous phase, whereby the impurities in the nickel solution can be removed.

Furthermore, the method is effective to prevent a product from being contaminated due to the incorporation of an impurity element, such as Na, contained in a pH adjusting agent into the nickel solution.

However, also in the solution purification step for nickel sulfate proposed in Japanese Patent Application Laid-Open No. H10-30135, magnesium in the solution resembles nickel in behavior, and accordingly it has been difficult to remove magnesium to the extent that nickel sulfate obtained may be used as a battery material.

Furthermore, in the case where a large amount of impurities, such as iron and aluminum, are contained in a nickel-containing material that serves as a raw material, a large amount of a neutralizing agent is required to separate the impurities therefrom using a process, such as neutralization, and in addition, there is a possibility that, when impurities are precipitated, valuables, such as nickel and cobalt, are also co-precipitated, thereby causing a loss, and hence it has not been easy to perform an efficient operation.

For these reasons, there has been desired a practical method capable of efficiently obtaining a high-purity nickel sulfate which has low-grade magnesium or chloride and is usable as a battery material, from a sulfuric acid solution containing a large amount of metal ions, such as magnesium, and chloride ions.

In such circumstances, an object of the present invention is to provide a removal method of an impurity-element for selectively removing magnesium from a nickel-containing acid solution and a method of producing high-purity nickel sulfate using said removal method.

SUMMARY OF THE INVENTION

To solve the above-mentioned problems, a first aspect of the present invention is a method for producing high-purity nickel sulfate, the method including a production process for producing nickel sulfate from a nickel-containing acid solution, and the nickel-containing acid solution in the production process being treated in order of the following steps (1) to (3):

(1) A carbonation step of adding a carbonating agent into the nickel-containing solution to make nickel contained in the nickel-containing solution into a precipitate of nickel carbonate or a precipitate of a mixture of nickel carbonate and nickel hydroxide, and thereby forming a slurry after carbonation including the precipitate and a solution after carbonation;

(2) A solid-liquid separation step of separating the slurry after carbonation formed in the carbonation step (1) into the precipitate of nickel carbonate or the precipitate of the mixture of nickel carbonate and nickel hydroxide, and the solution after carbonation; and (3) A neutralization step of adding a neutralizing agent into the solution after carbonation separated through the solid-liquid separation step (2) to recover nickel contained in the solution after carbonation as a nickel precipitate.

A second aspect of the present invention is a method for producing high-purity nickel sulfate, wherein the nickel-containing solution used in the first aspect is a nickel sulfate solution.

A third aspect of the present invention is a method for producing high-purity nickel sulfate, wherein the nickel-containing solution used in the first and the second aspects is a nickel sulfate solution obtained in such a manner that a nickel oxide ore is leached with sulfuric acid, whereby impurities other than a target component are separated to obtain a residue, and a sulfurizing agent is added to said residue to form a nickel sulfide, and said nickel sulfide is then leached with sulfuric acid.

The present invention provides the following industrially remarkable effects:

(1) Selective separation and removal of magnesium enables high-purity nickel sulfate to be produced; and (2) A mixture of nickel carbonate and nickel hydroxide formed in the carbonation step can be used as a neutralizing agent inside the system, whereby costs of a neutralizing agent can be reduced.

DETAILED DESCRIPTION

The present invention provides a method for producing high-purity nickel sulfate from a nickel-containing acid solution, wherein a series of the undermentioned steps (1) to (3) is included in a production process in this order, whereby high-purity nickel sulfate having a less amount of impurities is produced from a nickel-containing acid solution.

(1) A carbonation step, wherein a carbonating agent is added to a nickel-containing solution to make nickel contained in the nickel-containing solution into a precipitate of nickel carbonate or a precipitate of a mixture of nickel carbonate and nickel hydroxide, whereby a slurry after carbonation is formed, the slurry after carbonation being composed of a mixture of the precipitate and a solution after carbonation comprising an unprecipitated component other than the precipitate.

(2) A solid-liquid separation step, wherein the slurry after carbonation formed in the carbonation step (1) is separated into the precipitate (nickel carbonate or the mixture of nickel carbonate and nickel hydroxide) and the solution after carbonation.

(3) A neutralization step, wherein a neutralizing agent is added to the separated solution after carbonation through the solid-liquid separation step (2), whereby nickel contained in the solution after carbonation is separated and recovered as a nickel precipitate.

Hereinafter, a method for producing a high-purity nickel sulfate solution according to the present invention will be explained with reference to a production flowchart for high-purity nickel sulfate shown in FIG. 1 and a flowchart of a method for removing an impurity element from a nickel-containing acid solution shown in FIG. 2 according to the present invention.

Leaching Step

The leaching step is a step of forming a leached solution (a nickel-containing acid solution) after leaching of nickel by dissolving, with mineral acid (hydrochloric acid, sulfuric acid, or the like), a nickel-containing material that serves as a starting material, such as an industrial intermediate, comprising any one selected from nickel-cobalt mixed sulfide, crude nickel sulfate, nickel oxide, nickel hydroxide, nickel carbonate, nickel powder, and the like, or a mixture thereof. This leaching step can be implemented using a well-known method, for example, a method disclosed in Japanese Patent Application Laid-Open No. 2005-350766.

Solution Purification (Neutralization) Step

Figure 1:
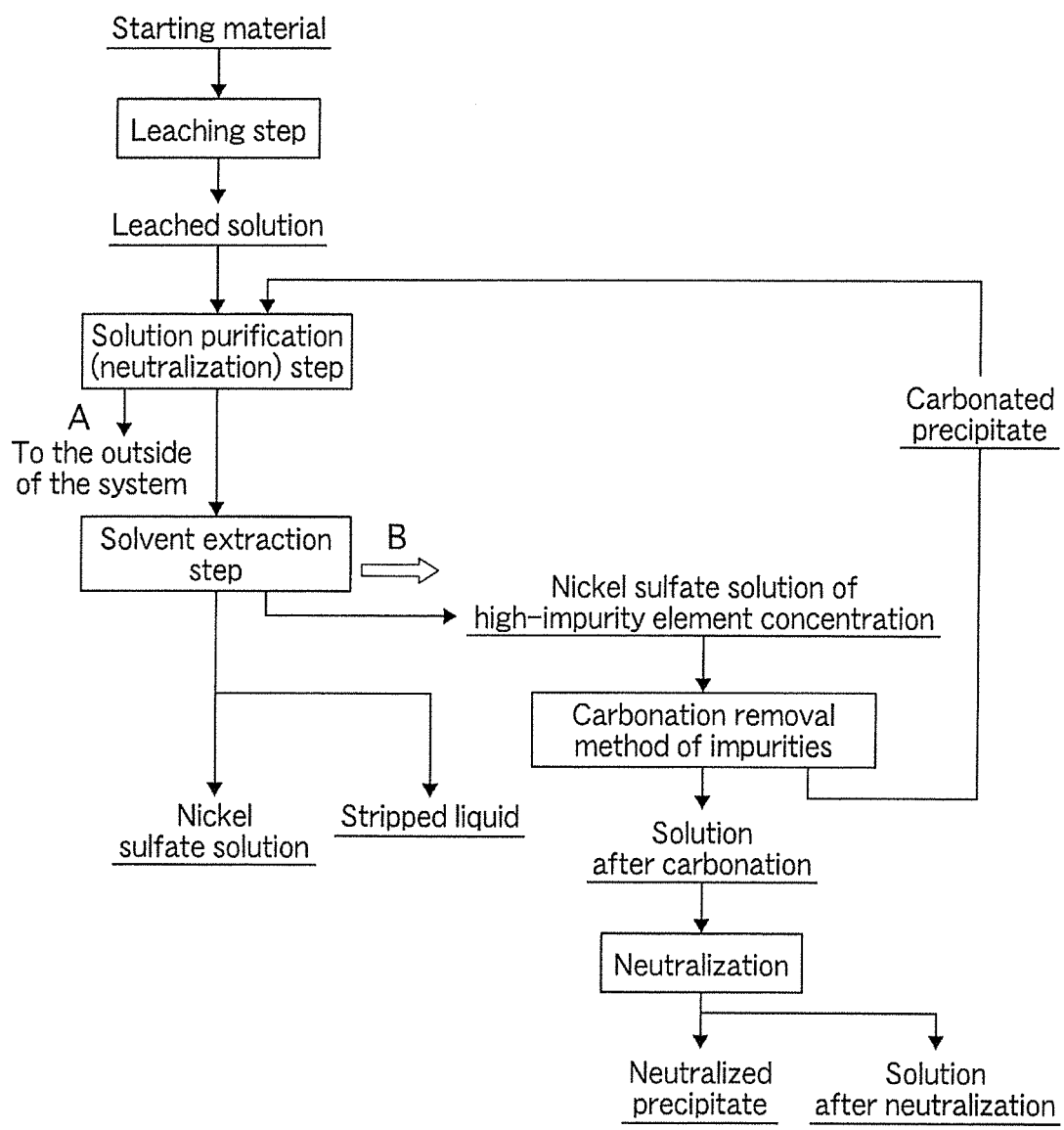
FIG. 1 is a production flowchart of high-purity nickel sulfate according to the present invention.
Figure 2:
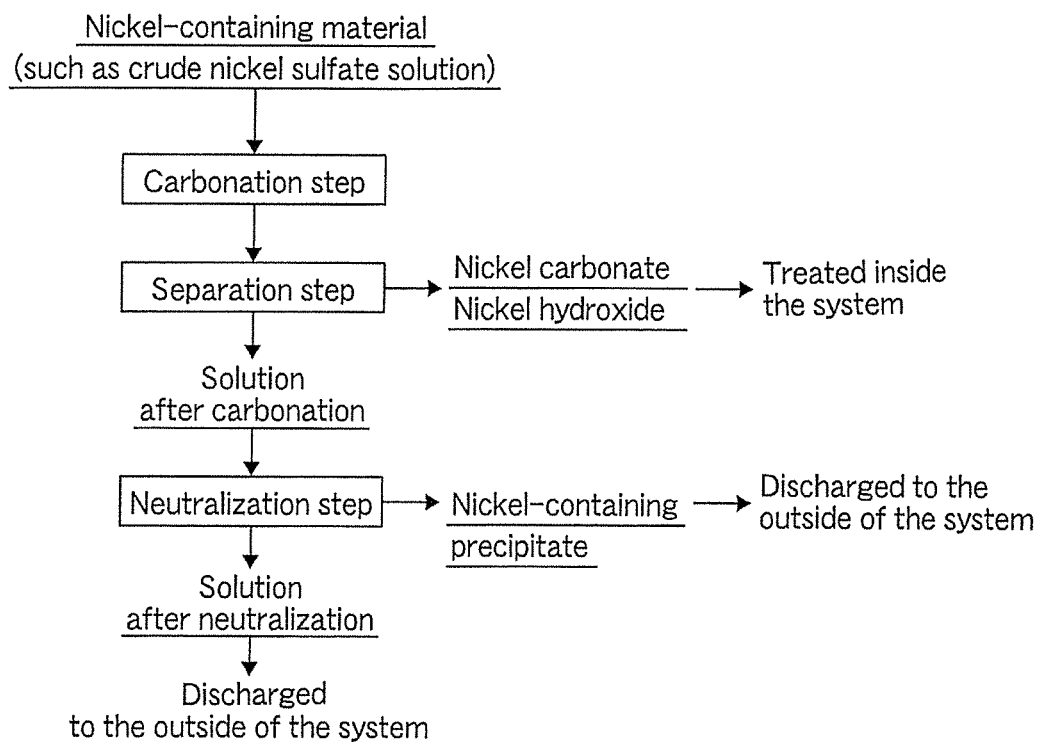
FIG. 2 is a flowchart for a removal method of an impurity element from a nickel-containing acid solution.

In the case of the use of an intermediate, such as sulfide produced from a solution obtained by leaching a nickel oxide ore, as the starting material, a large amount of valuables such as cobalt, and impurities not targeted for recovery are contained besides nickel to be targeted, and therefore these valuables and impurities need to be separated (Flow A in FIG. 1).

Specifically, when the concentration of iron, chromium, or aluminum in the leached solution is high, the solution purification (neutralization) step is implemented to remove these elements before solvent extraction.

Furthermore, using a solvent extraction method, cobalt, which is a valuable material and targeted for recovery, can be efficiently separated and recovered. However, magnesium, whose behavior resembles that of nickel, greatly affects the solvent extraction but can be easily separated by carbonation removal of impurities that is a removal method of impurity elements according to the present invention as mentioned later.

Furthermore, a common production process of nickel sulfate uses an original solution containing high-concentration of nickel and low-concentration of impurity, but, it is more economical to apply the present invention to a solution containing magnesium, that is, impurity, in as high concentration as possible and nickel in as low concentration as possible because the amount of a carbonating agent used to precipitate nickel as a mixture of carbonate and hydroxide can be reduced. In that respect, in the solvent extraction step, a mixing ratio of an organic phase to an aqueous phase is optimized, whereby the concentration of an element in a solution can be easily adjusted, and therefore a desired solution can be easily achieved (Flow B in FIG. 1, a reaction in a direction indicated by a hollow arrow).

Here, as a method for removing an impurity element according to the present invention, a carbonation removal method for impurities will be explained with reference to the flowchart in FIG. 2.

Removal of Impurity Element from In-Process Solution (1) Carbonation Step

In the carbonation step, a carbonating agent is added to an in-process nickel-containing material, particularly, an in-process nickel-containing solution (for example, a crude nickel sulfate solution) to precipitate nickel as nickel carbonate or a mixture of nickel carbonate and nickel hydroxide.

At this time, since elements, such as cobalt, zinc, copper, manganese, and chromium, form carbonate or hydroxide in a lower range of pH than the pH range in which nickel forms carbonate or hydroxide, these elements are precipitated together with nickel and accordingly not separated. These elements are thus separated by a method such as the solvent extraction or neutralization precipitation.

On the other hand, magnesium, sodium, potassium, and the like form carbonate or hydroxide less easily than nickel does, and these elements remain in the solution after carbonation, and therefore can be separated from nickel.

The carbonating agent used at this time is not particularly limited, but, sodium carbonate has been industrially widely used, and is preferable because it is easily available in large amounts.

The treatment temperature in the carbonation step is not particularly limited, but, preferably 40 to 80 degrees C.

A treatment temperature of less than 40 degrees C. causes a too long reaction time, thereby leading to larger-scale equipment and higher investment costs. On the other hand, a treatment temperature of not less than 80 degrees C. prohibits a resin material from being used for equipment, thereby causing a material for equipment to be limited and costs to be increased.

(2) Separation Step (Solid-Liquid Separation Step)

The precipitate (nickel carbonate or the mixture of nickel carbonate and nickel hydroxide) contained in the slurry after carbonation formed in the carbonation step (1) and a solution after carbonation as a residue are separated and recovered using a solid-liquid separation apparatus.

The solid-liquid separation apparatus to be used is not particularly limited, and a pressure filter, a suction filter, a decanter, or the like may be used. The mixture of nickel carbonate and nickel hydroxide which contains the recovered nickel as a main component can be reused by repeatedly using as a neutralizing agent in the solution purification step.

(3) Neutralization Step

The nickel carbonate or the mixture of nickel carbonate and nickel hydroxide, each having been separated as a precipitate in the solid-liquid separation step (2), can be reused as a neutralizing agent for pH regulation in another step.

On the other hand, the solution after carbonation containing impurities after the solid-liquid separation forms a neutralized solution comprising a neutralized precipitate as a precipitate which is formed by the neutralization treatment implemented by addition of the neutralizing agent and contains heavy metals, such as manganese, and a solution after carbonation; and then the neutralization solution is solid-liquid separated using a solid-liquid separation apparatus, thereby being separated into the neutralized precipitate (nickel-containing precipitate) containing an impurity element and the solution after carbonation.

The neutralizing agent to be used in the neutralization step is not particularly limited, but, sodium hydroxide, calcium hydroxide, magnesium hydroxide, or the like is inexpensive and thus suitably industrially used.

For the neutralization, the pH is suitably adjusted to a range of from 7.0 to 8.5.

This is because a pH of less than 7.0 leads to insufficient removal of manganese, on the other hand, a pH of more than 8.5 exceeds an effluent standard of pH value, and accordingly pH readjustment is required.

Solvent Extraction Step

Next, there is performed the solvent extraction step wherein an aqueous phase is made to come into contact with an organic phase thereby to exchange components of each of the phases to increase the concentration of a certain component in the aqueous phase, meanwhile to decrease the concentration of the other component therein. In the present invention, the solvent extraction step is implemented by a solvent extraction method wherein a crude nickel sulfate solution having a high concentration of impurity elements is used for the aqueous phase, meanwhile an organic solvent, such as phosphonic acid or phosphinic acid, or an nickel-containing organic solvent as disclosed in Patent Literature 2 is used for the organic phase, whereby a nickel sulfate solution and a stripped liquid are obtained.

In this solvent extraction step, changing conditions for the solvent extraction enables to adjust the concentration of impurity elements in a nickel sulfate solution to be formed. In this regard, a nickel sulfate solution with concentrated impurity elements therein is formed by solvent extraction, and the impurity element removal method shown in FIG. 2 is given to the nickel sulfate solution again, whereby higher purity of a nickel sulfate solution can be formed.

As mentioned above, the removal method of impurity elements from a nickel-containing acid solution is made to be included in the production process thereof, whereby magnesium can be selectively discharged from the production process system, and therefore these impurity elements are not accumulated inside the system, and as a result, high-purity nickel sulfate can be produced.

Nickel sulfate produced according to the present invention is, as a product form, made into a nickel sulfate solution or made into a nickel sulfate crystal using a common crystallization method, such as crystallization or spray drying.

Example 1

Hereinafter, using an example, the present invention will be further explained.

A simulated solution of a crude nickel sulfate solution containing impurities was prepared as a nickel-containing material as shown in Table 1. Six 200-ml aliquots of the simulated solution were taken and each of the aliquots was put into a corresponding one of six beakers, and maintained at 40 degrees C. in a water bath. A sodium carbonate solution was dropped into the aliquots in such a way as that 0.08, 0.23, 0.45, 0.68, 0.91, and 1.18 equivalents of sodium carbonate with respect to nickel were added to each of the aliquots, and samples of No. 1 to No. 6 shown in Table 2 were thus produced.

It should be noted that one equivalent mentioned here was calculated based on the following chemical reaction formula (1).

Formula 1

$$NiSO_4 + Na_2CO_3 \rightarrow NiCO_3 + Na_2SO_4 \quad (1)$$

At the time of the dropping, stirring was kept for 30 minutes so as to stabilize the pH value and make the reaction sufficiently proceed. Then, using a vacuum pump, Nutsche suction filtration is performed with a 5C filter paper, so that a mixture of nickel carbonate and nickel hydroxide as a precipitate and a solution after carbonation as a filtrate are formed.

Table 2 shows an amount of sodium carbonate added in the dropping, a nickel equivalent, a reaction temperature, a pH value, an amount of the filtrate, and an amount of the precipitate.

Figure 3:
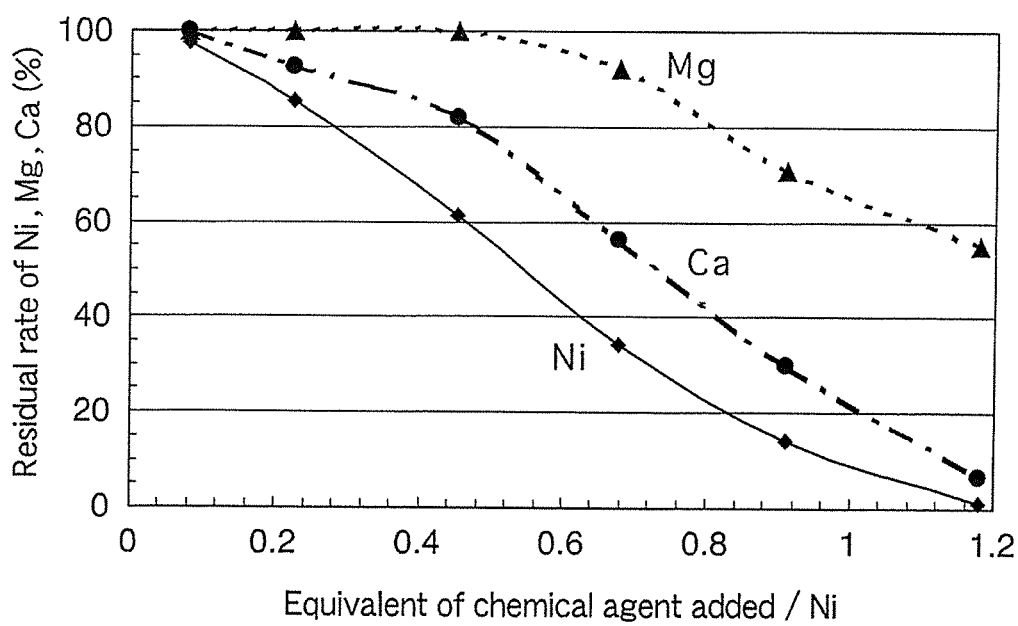
FIG. 3 is a chart showing relationships between an amount of sodium carbonate added and residual rates of Mg and Ca.

Furthermore, each element contained in the solution after carbonations as a filtrate was quantitatively analyzed by ICP emission spectrometry. Table 3 and FIG. 3 show the results. In FIG. 3, the horizontal axis represents an equivalent amount of a chemical agent added with respect to nickel (nickel equivalent), and the chemical agent added was sodium carbonate. The vertical axis represents residual rates (%) of Mg, Ca, and Ni contained in the filtrate.

TABLE 1

| Ni [g/L] | Co [g/L] | Mg [g/L] | Ca [g/L] | Mn [g/L] |
|---|---|---|---|---|
| 38 | 7.1 | 0.24 | 0.30 | 0.001 |

TABLE 2

| | Addition | | | | | | Precipitate | | |
|---|---|---|---|---|---|---|---|---|---|
| | amount of $Na_2CO_3$ | | Temperature | Stirring time | pH | | Filtrate | wet | dry | Moisture content |
| No. | [g] | Ni equivalent | [degrees C.] | [min.] | Initial | Final | [ml] | [g] | [g] | [%] |
| 1 | 1.2 | 0.08 | 40 | 30 | 4.69 | 6.38 | 202 | 5.77 | 1.26 | 78.2 |
| 2 | 3.4 | 0.23 | | | 4.73 | 6.33 | 200 | 18.82 | 6.09 | 67.6 |
| 3 | 6.8 | 0.45 | | | 4.80 | 6.37 | 208 | 35.35 | 11.59 | 67.2 |
| 4 | 10.2 | 0.68 | | | 4.81 | 6.45 | 223 | 48.49 | 12.88 | 73.4 |
| 5 | 13.7 | 0.91 | | | 4.85 | 6.74 | 215 | 65.64 | 20.06 | 69.4 |
| 6 | 17.7 | 1.18 | | | 4.89 | 7.54 | 231 | 64.29 | 22.57 | 64.9 |

TABLE 3

| No. | $Na_2CO_3$ [g] | Ni equivalent | Filtrate + Free water | Ni [g/L] | Co [g/L] | Mg [g/L] | Ca [g/L] | Mn [g/L] |
|---|---|---|---|---|---|---|---|---|
| 1 | 1.2 | 0.08 | 207 | 36 | 6.7 | 0.24 | 0.30 | 0.001 |
| 2 | 3.4 | 0.23 | 232 | 28 | 5.5 | 0.21 | 0.24 | <0.001 |
| 3 | 6.8 | 0.45 | 259 | 18 | 3.8 | 0.19 | 0.19 | <0.001 |
| 4 | 10.2 | 0.68 | 261 | 10 | 2.2 | 0.17 | 0.13 | <0.001 |
| 5 | 13.7 | 0.91 | 213 | 5.1 | 1.1 | 0.16 | 0.084 | <0.001 |
| 6 | 17.7 | 1.18 | 273 | 0.31 | 0.064 | 0.097 | 0.015 | <0.001 |

As can be seen from Table 3 and FIG. 3, in the case where 1.2 equivalents of sodium carbonate with respect to nickel is added, not less than 99% of nickel is present in a precipitate, while 42% of magnesium is present in the precipitate and 58% of magnesium is present in a filtrate, and hence, it is understood that addition of a carbonating agent enables nickel and magnesium to be separated.

The invention claimed is:
1. A method comprising:
providing a nickel-containing solution,
treating the nickel-containing solution in order of the following steps of (1) to (3):
(1) adding a carbonating agent to the nickel-containing solution,
precipitating a carbonated nickel precipitate of nickel carbonate or a mixture of nickel carbonate and nickel hydroxide;
(2) separating the carbonated nickel precipitate and a solution after carbonation; and
(3) adding a neutralizing agent to the solution after carbonation, and therefrom recovering a nickel precipitate.

2. The method of claim 1, wherein the nickel-containing solution is a nickel sulfate solution.

3. The method of claim 2, wherein the nickel sulfate solution was obtained by leaching a nickel oxide ore with sulfuric acid, separating impurities other than a target component to obtain a residue, and adding a sulfurizing agent to the residue to form a nickel sulfide, and then leaching the nickel sulfide with sulfuric acid.

4. The method of claim 1, wherein the nickel-containing solution is a nickel sulfate solution obtained by leaching a nickel oxide ore with sulfuric acid, separating impurities other than a target component to obtain a residue, and adding a sulfurizing agent to the residue to form a nickel sulfide, and then leaching the nickel sulfide with sulfuric acid.

5. The method of claim 1 wherein the nickel-containing solution is a crude nickel sulfate solution; wherein the crude nickel sulfate solution includes nickel and magnesium.

* * * * *